No. 885,373. PATENTED APR. 21, 1908.
J. H. PIERCE.
CORN SILKER.
APPLICATION FILED MAR. 15, 1906.
6 SHEETS—SHEET 4.
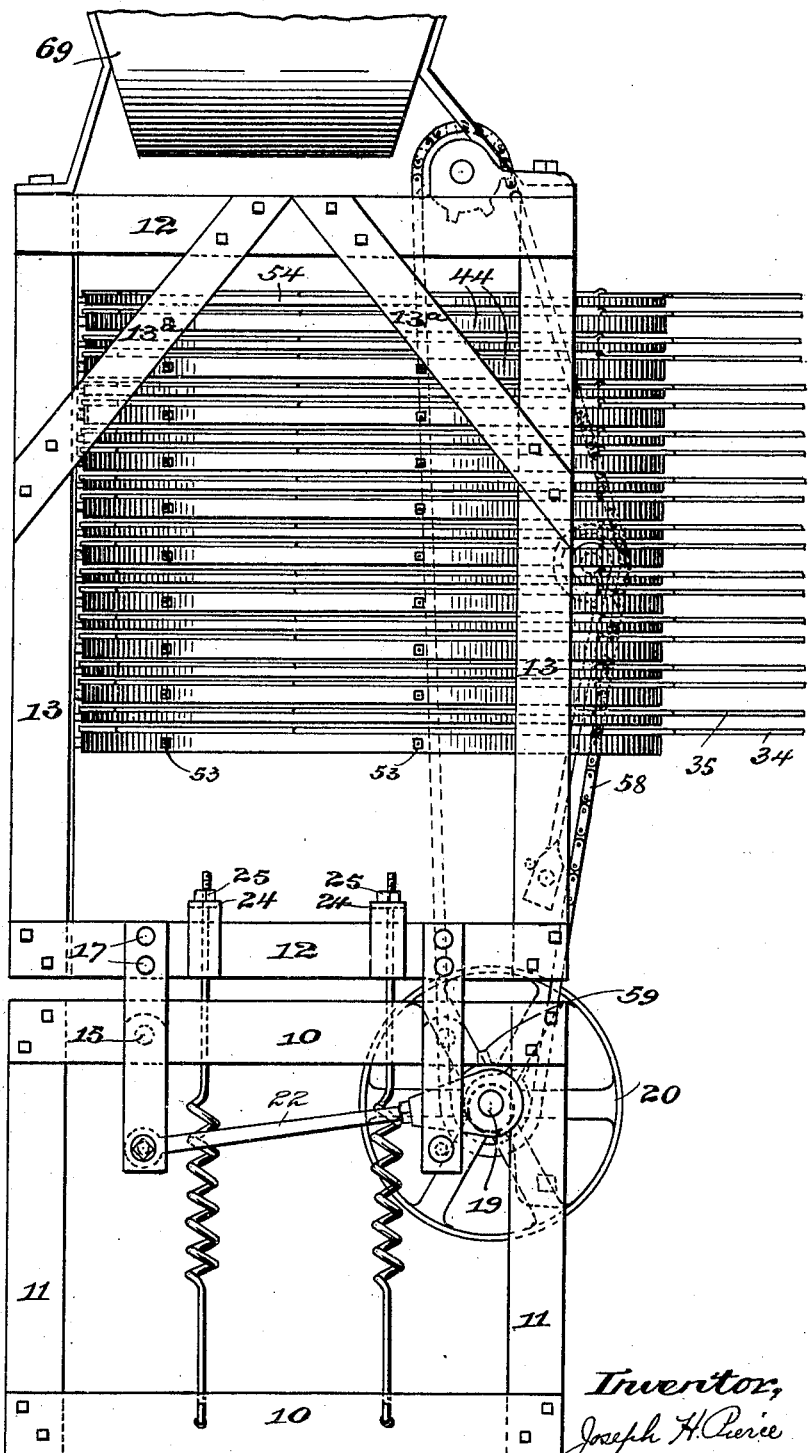

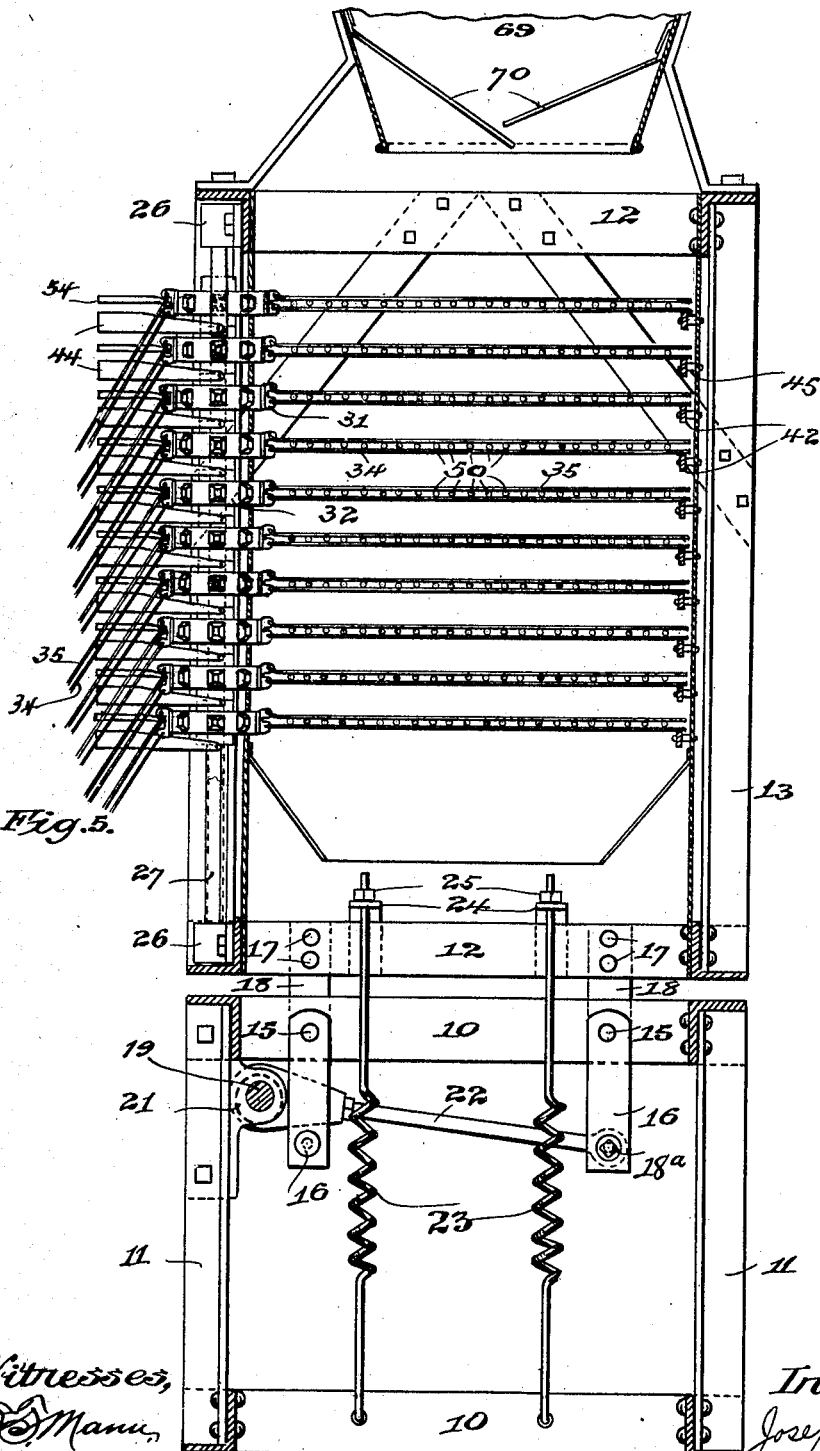

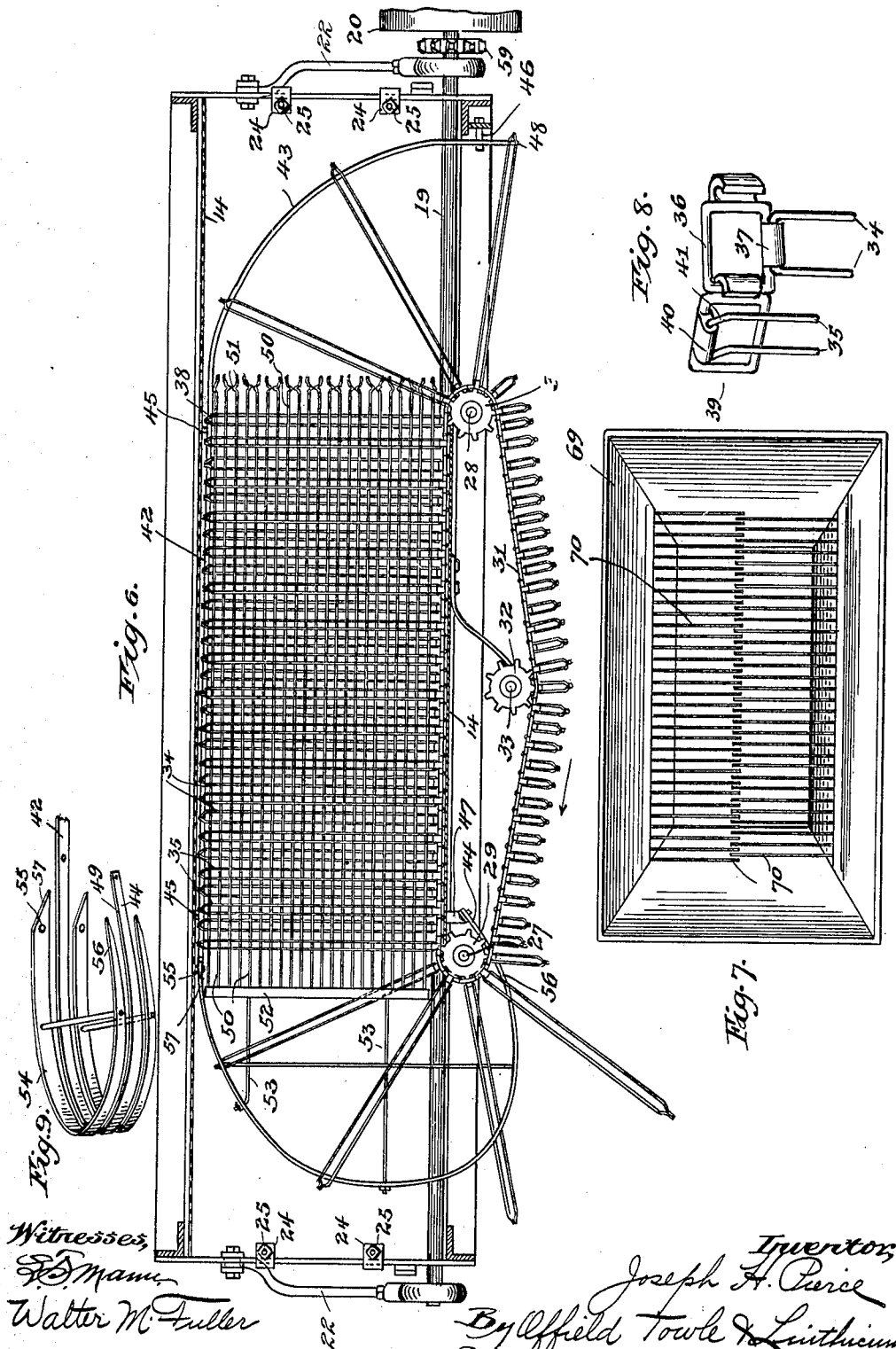

UNITED STATES PATENT OFFICE.

JOSEPH H. PIERCE, OF CHICAGO, ILLINOIS.

CORN-SILKER.

No. 885,373.   Specification of Letters Patent.   Patented April 21, 1908.

Application filed March 15, 1906. Serial No. 306,295.

*To all whom it may concern:*

Be it known that I, JOSEPH H. PIERCE, a citizen of the United States, residing at Chicago, in the county of Cook and State of Illinois, have invented certain new and useful Improvements in Corn-Silkers, of which the following is a specification.

My invention pertains to corn silkers which remove the threads of silk from the corn after it has been cut from the cob.

Several types of machines have been devised for combing the silk from the corn, but my invention includes a combined strainer and silker, any stray pieces of cob or husk being eliminated from the corn as well as the silk.

In its preferred and most complete form the machine of my invention includes a vibratory receptacle or rocking casing within which are a number of vertically spaced layers of wire rods or fingers, crimped to maintain them in their proper positions, and co-acting with these wiping their top and bottom surfaces are a plurality of traveling rods or fingers disposed at right angles to the first mentioned or stationary rods or fingers. These tiers of rods form a series of superposed strainers which separate the silk and pieces of cob or husk from the mass of cut corn fed to the strainers through an upper hopper, provided with internal means for breaking up the mass of corn when it is dumped into the same. The corn after passing through the strainers, that is through the interstices between the many fingers or rods, is received in any common type of vessel or tank. There are as many sprocket chains to which the traveling rods are pivotally secured as there are layers or tiers of stationary rods or fingers and the machine is so constructed that during a portion of the travel of the movable rods, the latter are allowed to drop due to gravity, their downward movement being suddenly arrested to shake off whatever silk may be adhering thereto. These movable fingers or wire rods are again raised to a height to coöperate with the fixed spaced rods by eccentric cams which perform the additional function of scraping the fingers longitudinally to wipe off any silk threads which cling tenaciously thereto.

Figure 1:
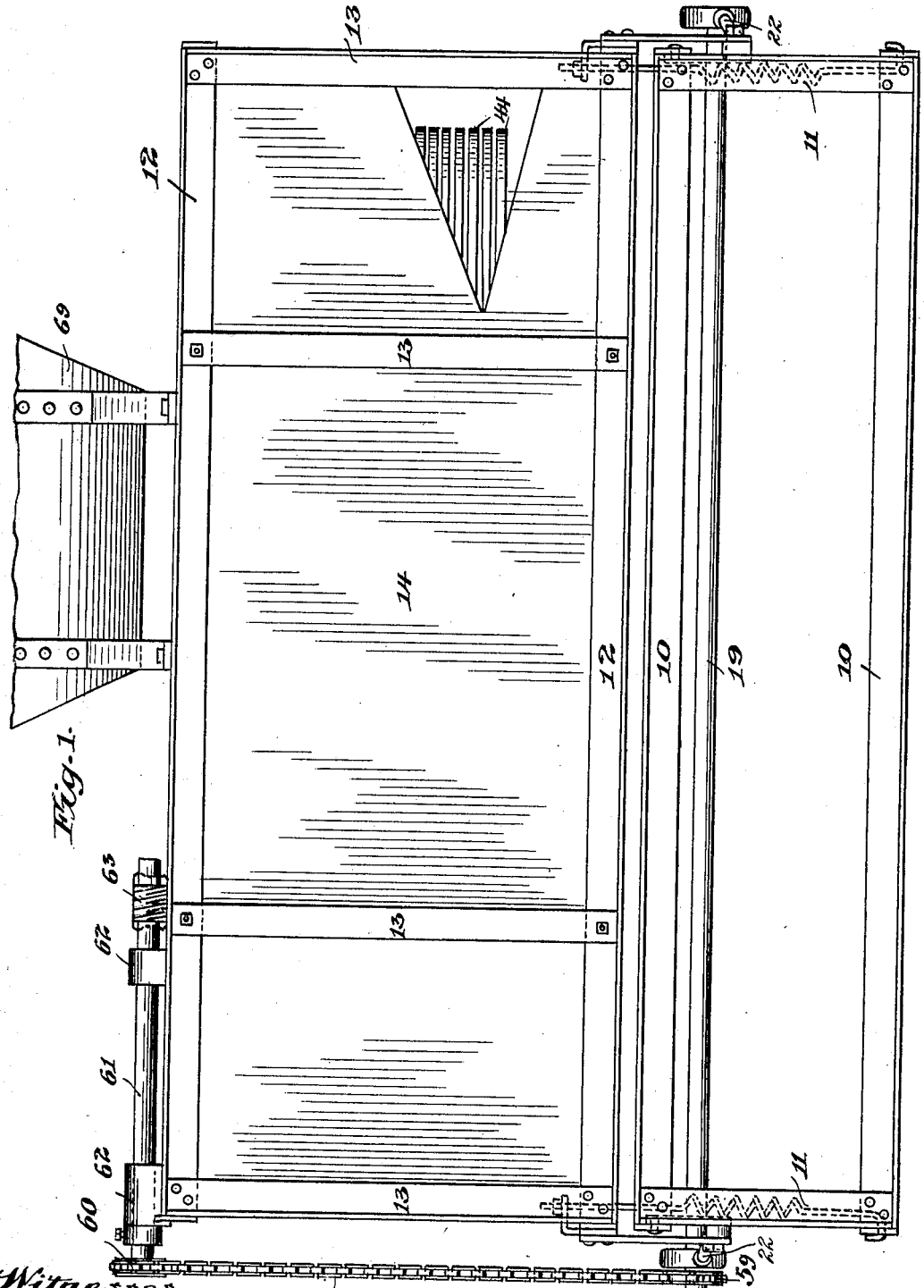
Figure 2:
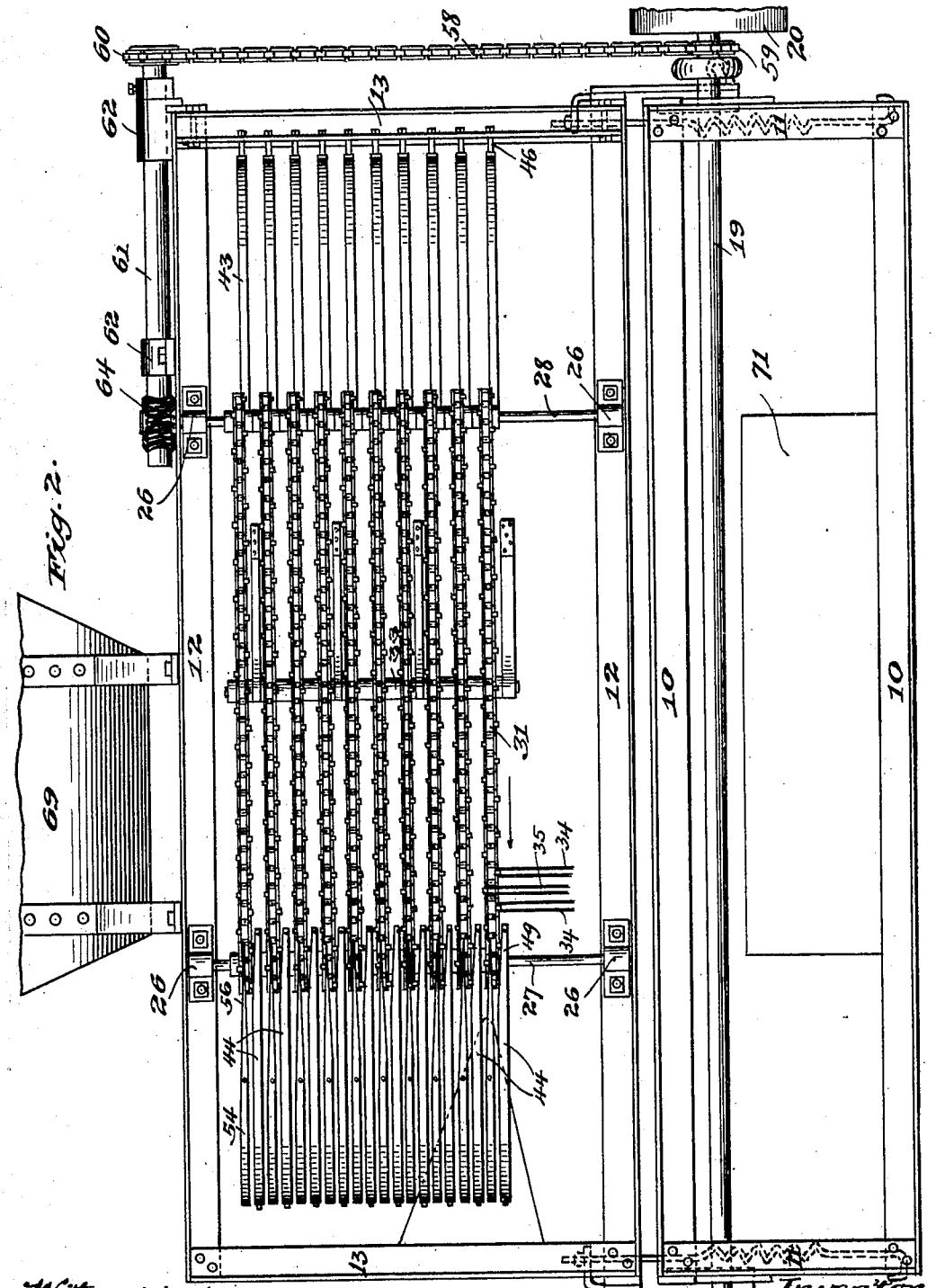
Figure 3:
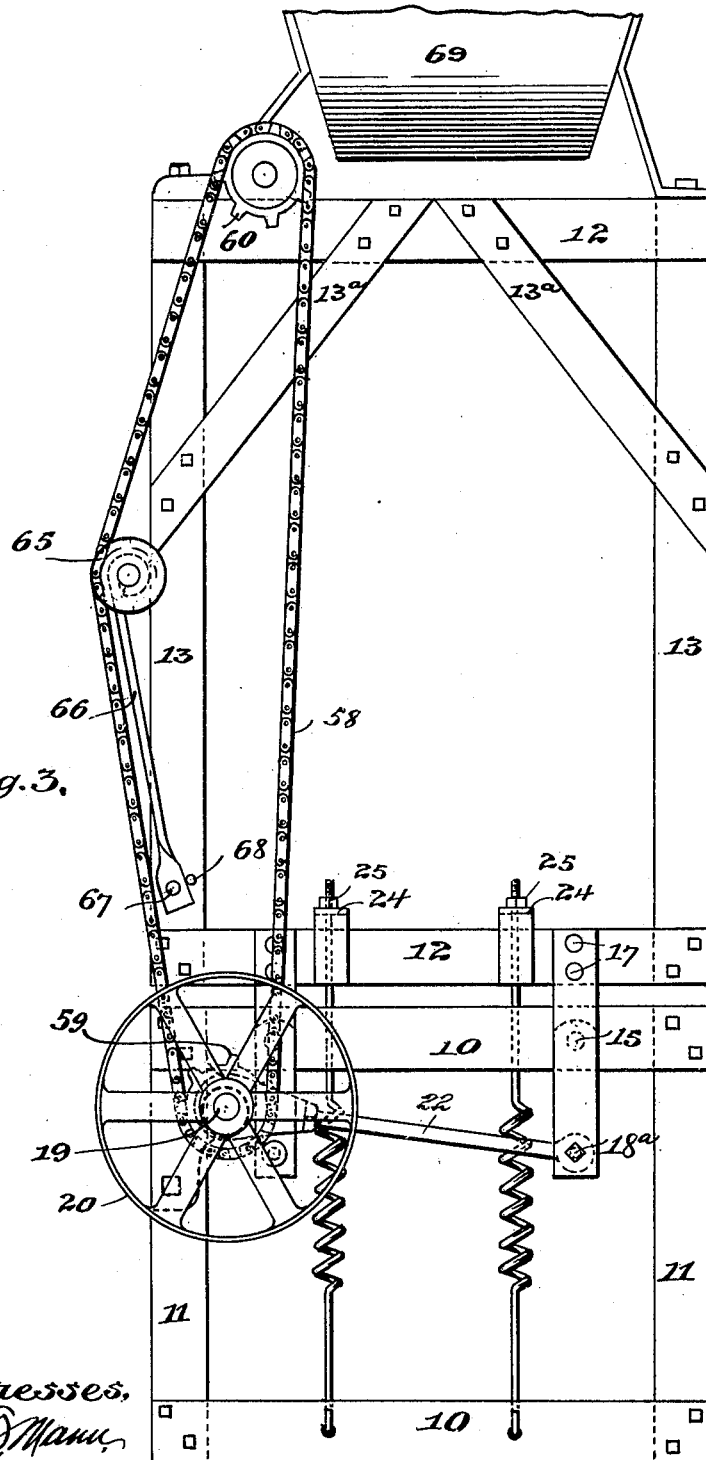

The preferred embodiment of my invention is illustrated in the accompanying drawings, wherein Figure 1 is a side elevation of my improved corn silker; Fig. 2 is an elevation of the opposite side of the machine with the rods which are pivotally attached to the sprocket chains omitted; Fig. 3 is a view of the left-hand end of the machine as viewed in Fig. 1; Fig. 4 is a view of the opposite end of the machine; Fig. 5 is a vertical cross-section of the silker; Fig. 6 is a horizontal sectional view of the machine the plane of the section being below the hopper; Fig. 7 is a plan view of the receiving hopper; Fig. 8 is a perspective view of a portion of one of the sprocket chains to which the movable rods are pivotally attached; and Fig. 9 is a fragmentary perspective view of the rod elevating and supporting tracks.

A rectangular frame comprising the horizontal and vertical angle bars 10 and 11 respectively is adapted to rest upon the floor and support an upper frame including the horizontal and vertical angle bars 12 and 13 respectively and braces 13$^a$, the upper frame being partially lined on its sides by metallic sheets 14. This upper frame or casing is mounted on the lower frame so as to have a vibratory or rocking movement and for this purpose there is pivoted at 15 to each end of the lower or supporting frame two depending links 16 [Fig. 5]. Rigidly attached to the lower portion of the upper frame at each end by means of rivets or bolts 17 are two downwardly projecting bars 18 secured at their lower ends to the free ends of links 16 by the bolts or pins 18$^a$. Extending longitudinally of the lower frame is a shaft 19 mounted in suitable bearings and adapted to be rotated by a pulley 20 keyed to one end thereof. At its opposite ends shaft 19 is provided with eccentrics 21 which vibrate the upper casing by means of eccentric rods 22 which are connected as shown in the figures of the drawings to the bolts 18$^a$. The upper casing is automatically centered with respect to the lower frame by means of springs 23 two of which are supplied at each end of the device and which are fastened at their lower ends to the supporting frame and at their upper ends at 24 to a portion of the upper frame inclosing the casing. The tension of these springs as is usual may be adjusted by means of nuts 25 threaded on their top ends.

Suitably mounted in bearings 26 [Fig. 2] on the upper frame are two vertical rotary shafts 27 and 28 equipped with a number of vertically spaced alined sprocket wheels 29 and 30 [Fig. 6] respectively. In the present instance we have shown 10 of these wheels on each of the shafts, but of course the exact number is immaterial. Traveling upon these sprocket wheels are ten sprocket chains 31 which also pass over and coöperate with idler sprocket wheels 32 mounted on a vertical shaft 33. Each chain is equipped with a plurality of spaced outwardly extended upper and lower rods 34 and 35, the former being pivotally secured to the lower portions of alternate links and the latter pivotally attached to the upper portions of the remaining alternate links. To facilitate this mounting of the rods I provide on each alternate link 36 a lower integral boss 37 perforated to receive the bent wire which forms two parallel rods 34, the outer ends of the rods being crimped at 38 so as to hold them properly spaced apart. Each alternate link 39 is similarly provided with an upper boss 40 perforated to receive a wire which when inserted therein and bent comprises two parallel rods 35 similarly crimped. Rods 35 are preferably bent at 41 so that when the rods 34 and 35 are in a horizontal position they are spaced apart an amount approximately equivalent to the thickness of the rods for a purpose explained hereinafter.

To elevate the lower bars 34 from their depending position to a substantially horizontal disposition I provide for each chain a track or supporting bar 42 having curved ends 43 and 44 which is suitably supported in any convenient manner at the points 45, 46 and 47. The end 43 is curved concentric with shaft 28 and is distant therefrom an amount so as to support the ends of rods 34 and 35. End 43 terminates abruptly at 48. The curved end 44 is eccentric relatively to shaft 27 and terminates adjacent thereto at the support 47. Each end 44 is also beveled on its upper surface at 49 [Fig. 2] so as to gradually raise the rods 34 as they travel forwardly in the direction indicated by the arrows.

Resting upon each layer of lower moving transverse rods 34 is a sort of gridiron-like member comprising the longitudinal parallel rods 50 crimped as at 51 to properly space them apart and an end bar 52 to which one end of the rods are secured. As will be observed from the drawing, the free ends of these rods 50 are wholly unobstructed thereby permitting silk threads to be longitudinally wiped therefrom. These ends are free, their only support being the movable transverse rods 34 beneath them, which in connection with the top rods or wires 35 form the wiping means. To anchor these gridiron members to prevent forward movement of the same they are each attached by one or more bolts or bars 53 to the curved end 44 of the corresponding bar 42 or in any other convenient manner.

To lift the upper rods 35 to horizontal position there is provided for each chain 31 a curved bar 54 desirably supported at 55 and tapered and pointed at 56 which point reaches between the upper and lower rods 34 and 35 as they arrive at the sprocket wheel 29. Each bar 54 is eccentric to shaft 27 as is bar 44 and at its end is beveled at 57 to permit the rods 35 as they pass along to ride down the incline on to the parallel longitudinal gridiron rods or bars 50; then the lower rods 34 support both the stationary gridiron rods and the upper rods 35, the movable rods wiping the stationary bars on their top and bottom surfaces and forming therewith a strainer of which the transverse rods travel longitudinally of the other rods.

Power to move the rod supporting chains 31 is transmitted from shaft 19 through the substantially vertical sprocket chain 58 which coöperates with sprocket wheels 59 and 60 mounted on shafts 19 and 61 respectively, the latter turning in bearings 62 on the top of the vibrating upper frame. A worm 63 on shaft 61 meshes with and turns a gear 64 on the top of shaft 28. In order to maintain chain 58 taut, the tension thereof varying because of the rocking or vibrating of the frame-work, there is employed an idler 65 pivotally mounted on the upper end of an arm 66 pivoted to the upper frame at 67, a stop 68 preventing arm 66 from rising to a vertical position whereby the arm and its idler due to their weight tend to fall outwardly and maintain the chain 58 in tightened condition. Above the series of strainers is a hopper 69 having sets of converging fingers or prongs 70 for the purpose of breaking up the mass of corn as it passes through the hopper to the strainers, below which is a receptacle 71 adapted to receive the silked corn free from foreign substances.

The operation of the device is as follows:— The corn when fed to the hopper is broken up by the fingers 70 and then passes to the agitated and traveling strainers through which it passes to the lower receptacle or tank 71, the strainers acting to remove not only the silk but also any pieces of foreign substance such as cob or husks which are carried along with the traveling strainer rods to the end of the stationary rods where they fall below into any convenient receptacle placed to receive them. Whatever silk threads adhere to the stationary rods are wiped longitudinally thereof by the lower and upper traveling rods, and when the threads arrive at the ends of the stationary rods a portion of them drop into the receptacle while some still adhere to the traveling rods. When the rods or fingers 34 and 35, both sets of which are upheld by the curved end 43, reach the point 48 they suddenly drop due to their weight and are quickly arrested in their downward movement the result of this operation being to shake off practically all of the adhering silk threads. If any threads do, however, still cling to the rods they are removed when the rods are brought to horizontal position by the eccentric bars 44 and 54 which wipe the lower surface thereof moving the silk threads longitudinally of the bars until they drop off. It will thus be seen that the stationary longitudinal bars are wiped on their top and bottom surfaces by the moving bars and that the latter have two means of removing the threads adhering thereto, first—their dropping and sudden arrestment; second—their longitudinal wiping by the eccentric bars which raise them to horizontal position.

This specification sets forth the main features of my invention, but it will be readily apparent to those skilled in the art that the details of the structure may be varied widely without departing from the substance or real essence of the invention.

I claim:

1. In a corn silker, the combination of a series of rods so mounted as to be wholly unobstructed at one end thereof, and a second series of rods movable longitudinally with respect to and below the rods of said first series to remove silk threads adhering thereto from said unobstructed ends, said first and second series of rods forming a screen or sieve, substantially as described.

2. In a corn silker, the combination of a series of rods so mounted as to be wholly unobstructed at one end thereof, and a second series of rods movable longitudinally with respect to the rods of said first series to remove silk threads adhering thereto from said unobstructed ends, said first and second series of rods forming a screen or sieve, substantially as described.

3. In a corn silker, the combination of a series of rods so mounted as to be wholly unobstructed at one end thereof, a second series of rods arranged transversely to and movable longitudinally with respect to the rods of said first series, said first and second series of rods forming a screen or sieve, and means to move said second series of rods longitudinally of said first series to wipe the latter and remove silk threads adhering thereto from said unobstructed ends, substantially as described.

4. In a corn silker, the combination of a series of stationary rods, a second series of rods movable longitudinally of said first series to remove adhering silk threads, said stationary rods lying upon said movable rods, substantially as described.

5. In a corn silker, the combination of a series of stationary rods, a second series of rods movable longitudinally of said first series to remove adhering silk threads, said stationary rods lying upon said second series of rods, and a third series of rods movable longitudinally of said stationary rods and lying thereupon, substantially as described.

6. In a corn silker, the combination of a series of stationary rods, a series of rods beneath said stationary rods movable longitudinally thereof, and a series of rods above said stationary rods and movable longitudinally thereof, both series of movable rods contacting with and wiping said stationary rods, substantially as described.

7. In a corn silker, the combination of a movable chain, a series of rods secured to and movable with said chain, means for supporting the ends of said rods, and a second series of rods lying upon said first series, substantially as described.

8. In a corn silker, the combination of a movable chain, a first series of rods secured to and movable with said chain, a second series of stationary rods lying upon said first series, a third series of rods secured to and movable with said chain and lying upon said stationary rods, substantially as described.

9. In a corn silker, a series of rods mounted so as to drop to take off threads of silk adhering thereto, means to suddenly arrest the downward movement of said rods, and means to maintain said rods in operative condition to catch the silk threads as the corn passes between the rods, substantially as described.

10. In a corn silker, a series of movable rods mounted so as to automatically drop during a portion of their travel to shake off threads of silk adhering thereto, and means to maintain said rods in operative position during a portion of their travel to catch the silk threads as the corn passes between the rods, substantially as described.

11. In a corn silker, the combination of a movable chain, a series of rods pivotally secured to said chain, and means to sustain said rods in operative position during a portion of their travel to catch silk threads and permitting said rods to drop to shake off threads of silk adhering thereto, substantially as described.

12. In a corn silker, the combination of a series of stationary rods, a movable substantially horizontal chain, a second series of rods pivotally secured to said chain, said second series of rods being adapted to travel longitudinally of said stationary rods, means to support said second series of rods in substantially horizontal position for a portion of their travel and permitting them to drop to shake off threads of silk adhering thereto, substantially as described.

13. In a corn silker, the combination of a series of stationary rods, a movable chain, a second series of rods pivotally secured to said chain adapted to travel longitudinally of said stationary rods above the same, a third series of rods pivotally secured to said chain adapted to travel longitudinally of said stationary rods below the same, means to sustain said second and third series of rods in substantially horizontal position for a portion of their travel and permit their drop to shake off threads of silk adhering thereto, substantially as described.

14. In a corn silker, the combination of a movable chain, a series of lower rods pivotally secured to said chain, a support adapted to sustain said rods in substantially horizontal position for a portion of their travel and permit their drop to shake off threads of silk adhering thereto, a series of stationary rods resting upon said lower rods, a series of upper rods lying upon said stationary rods and pivotally secured to said chain, said series of upper rods being also adapted to drop and shake off threads of silk, and means to elevate said series of said upper and lower rods to substantially horizontal position, substantially as described.

15. In a corn silker, the combination of a series of rods, a second series of rods arranged transversely to and in contact with said first series of rods, said second series of rods being also movable longitudinally of and forming a screen or sieve with said first series of rods, whereby said first series of rods is wiped by said second series of rods, and means to longitudinally wipe said transverse rods, substantially as described.

16. In a corn silker, the combination of a series of rods, a second series of rods adapted to wipe the same, means to support said second series of rods in operative position during a portion of their travel and to permit their drop to shake off threads of silk adhering thereto, and means to wipe said second series of rods, substantially as described.

17. In a corn silker, the combination of a series of rods, a second series of rods movable longitudinally thereof and adapted to wipe the same, means to support said second series of rods in operative position during a portion of their travel and permit their drop to shake off adhering threads of silk, and means to simultaneously raise said second series of rods to operative position and wipe the same longitudinally, substantially as described.

18. In a corn silker, the combination of a shaft, a series of rods mounted to travel around said shaft and project outwardly therefrom, and a wiper for said rods eccentric to said shaft, substantially as described.

19. In a corn silker, the combination of two vertical shafts, a sprocket wheel on each of said shafts, a sprocket chain on said sprocket wheels, a series of rods pivoted to said chain, means to support said rods in operative position for a portion of their travel and permitting them to drop, and a cam eccentric to one of said chains adapted to raise said rods to operative position and to wipe the same longitudinally, substantially as described.

20. In a corn silker, the combination of two vertical rotary shafts, a sprocket wheel on each of said shafts, a chain passing over said sprocket wheels, a series of lower rods pivoted to said chain, a support for said rods adapted to sustain the same in substantially horizontal position for a portion of their travel and permit their drop, a series of stationary rods resting upon said lower rods, a series of upper rods pivoted to and movable with said chain and adapted to rest on said stationary rods, and two cams eccentric to one of said shafts adapted to simultaneously raise said lower and upper rods to substantially horizontal position and wipe the same longitudinally, substantially as described.

21. In a corn silker, the combination of a vibratory receptacle or casing, means to vibrate the same, two vertical rotary shafts mounted on said receptacle, a sprocket wheel on each of said shafts, a sprocket chain on said sprocket wheels, a series of lower rods pivoted to said chain and adapted to travel therewith, a support for said rods sustaining the same in substantially horizontal position for a portion of their travel and permitting their drop to shake off adhering silk threads, a series of stationary rods resting on said lower rods, a series of upper rods pivoted to said chain and movable therewith and adapted to rest upon said stationary rods, and two cams eccentric to one of said shafts adapted to simultaneously raise said lower and upper rods to substantially horizontal position and wipe the same longitudinally, substantially as described.

22. In a corn silker, the combination of a vibratory receptacle, means to vibrate said receptacle, a hopper mounted on said receptacle and provided with means to break up the corn dumped therein, two vertical rotary shafts mounted on said receptacle, a sprocket wheel on each of said shafts, a sprocket chain on said sprocket wheels, a series of lower rods pivoted to said chain and adapted to travel therewith, a support for said rods sustaining the same in substantially horizontal position for a portion of their travel and permitting their drop to shake off adhering silk threads, a series of stationary rods resting on said lower rods, a series of upper rods pivoted to said chain and movable therewith and adapted to rest upon said stationary rods, and two cams eccentric to one of said shafts adapted to simultaneously raise said lower and upper rods to substantially horizontal position and wipe the same longitudinally, substantially as described.

23. In a corn silker, the combination of a series of rods, a movable series of rods contacting with the rods of said first series to wipe the same and remove adhering silk threads, the rods of both series being crimped whereby to space them apart, substantially as described.

JOSEPH H. PIERCE.

Witnesses:
WALTER M. FULLER,
L. F. McCREA.